United States Patent [19]

Tanahashi et al.

[11] Patent Number: 5,031,106
[45] Date of Patent: Jul. 9, 1991

[54] MACHINE TOOL

[75] Inventors: Yasuo Tanahashi; Shouki Yasuda, both of Nagoya; Kouichi Yasumoto, Chiryu, all of Japan

[73] Assignee: Brother Kogyo Kabushiki Kaisha, Japan

[21] Appl. No.: 373,818

[22] Filed: Jun. 30, 1989

[30] Foreign Application Priority Data

Jun. 30, 1988 [JP] Japan .................. 63-163136

[51] Int. Cl.$^5$ ............................................. G06F 15/46
[52] U.S. Cl. .................... 364/474.28; 364/474.19; 364/474.2; 364/474.34
[58] Field of Search ............. 364/478, 474.24, 474.34, 364/474.28, 474.01, 474.02, 474.11, 474.19, 474.2, 474.35; 318/571

[56] References Cited

U.S. PATENT DOCUMENTS

| 4,044,289 | 8/1977 | Wenzel et al. | 318/571 |
| 4,237,598 | 12/1980 | Williamson | 364/474.24 |
| 4,473,883 | 9/1984 | Toshida et al. | 364/474.24 |
| 4,481,568 | 11/1984 | Inaba et al. | 364/474.2 |
| 4,578,748 | 3/1986 | Abe et al. | 364/474.34 |
| 4,580,207 | 4/1986 | Arai et al. | 364/478 |
| 4,608,654 | 8/1986 | Schafsteller | 364/474.01 |
| 4,639,653 | 1/1987 | Anderson | 364/474.34 |
| 4,733,343 | 3/1988 | Toneda | 364/474.19 |
| 4,748,570 | 5/1988 | Shochi et al. | 364/474.34 |
| 4,858,102 | 9/1990 | Lovrenich | 364/478 |

FOREIGN PATENT DOCUMENTS 29402 9/1985 Japan .

Primary Examiner—Jerry Smith
Assistant Examiner—Jim Trammell
Attorney, Agent, or Firm—Oliff & Berridge

[57] ABSTRACT

A machine tool includes a spindle head (4) movable in a predetermined direction, a spindle (9) attached to the spindle head (4) for undergoing machining of a workpiece, a column (3) supporting the spindle head (4), the column (3) being movable over a predetermined plane (X-Y plane) perpendicular to the predetermined direction so that the spindle head (4) is movable over a plurality of machining regions (22L, 22R), a plurality of palettes (23L, 23R) each detachably mounting the workpiece and movable into and away from its associated machining region, and a table (13) mounting the plurality of palettes (23L, 23R) thereon. In one aspect of the invention, an external operation box (101) is provided from which a selected program number is entered and is impressed on an input port of a CPU (100). The CPU (100) calls a machining program identified by the selected program number to thus perform machining of the palette loaded on the associated machining region. In another aspect of the invention, an end point to which the column is finally moved is checked if it is within an allowable movement range of the column and the movement of the column is prohibited if the end point is out of the allowable range.

4 Claims, 11 Drawing Sheets

// MACHINE TOOL

BACKGROUND OF THE INVENTION

The present invention relates generally to machine tools, and more particularly to a machine tool provided with a plurality of machining regions wherein a plurality of palettes each detachably mounting a workpiece are movable into and away from its associated machining region.

In undergoing machining operations with respect to the plurality of palettes on a palette basis, a wanted sub-program is conventionally called to merge it with a relevant program, thereby forming a machining program suitable for the intended machining operation. Alternatively, with an external program selection device having program selection switches, an intended machining program is selected by the manipulation of the selection switches.

The former is, however, disadvantageous in that the palette to be machined is selected by the machining program and that the order of the palette selection is definitely determined and cannot be determined arbitrarily. While the latter is capable of arbitrarily determining the palette selection, another disadvantage is encountered in that it is necessary to select a machining program with respect to the selected palette by designating a program number assigned to the intended machining program through a sequencer. It is therefore intricate to provide a device for selecting a program number corresponding to the intended machining program. Moreover, when the machining program applied to the workpiece mounted on the palette is replaced with another, it takes considerably long time to operate the sequencer and select the relevant program.

When the machining operation is implemented in accordance with the relevant program, it is necessary to check whether or not an end position to which a tool is finally moved is within an allowable movement range. If the end position of the tool is outside the allowable movement range, the machining operation must be stopped. Japanese Patent Publication (Examined) No. 59-47322 discloses a stroke over detection method complying with the above requirement.

However, the stroke over detection method disclosed in the Japanese Patent Publication is capable of detecting a stroke over status when the movement of the tool exceeds a single predetermined stroke. Therefore, in the machine tool in which a plurality of palettes are introduced into the corresponding machining regions and the machining operation is undergone on palette basis, an allowable maximum movement range applicable to all the machining regions needs to be determined, alternately an individual allowable movement range needs to set to each of the machining regions. The former is not satisfactory in the case where an error is contained in the machining program. Because, despite the fact that the tool should not be moved exceeding a predetermined position, the tool is allowed to move beyond that position insofar as the latter position is within the allowable movement range. The latter is also unsatisfactory in that setting of the individual allowable movement ranges is intricate and a setting error is liable to occur.

Further, a requirement exists in undergoing the machining operation in that the movement of the tool must be restricted so as not to enter into another machining region. Conventionally, the restriction of the movement of the tool is implemented by software. However, should there be an error in the software program or a runaway of a central processing unit, the intended control can not be accomplished and thus the reliability is lowered.

Moreover, when the workpieces are intended to be machined into the same shape or configuration, individual machining programs are needed corresponding to the plurality of palettes mounting the workpieces. However, a large quantity of memory is required to store the individual machining programs.

SUMMARY OF THE INVENTION

The present invention has been made to eliminate the foregoing disadvantages, and it is an object of this invention to provide a machine tool in which selection of a machining program can arbitrarily be performed, and designation of a relevant machining program and alteration of a machining program can readily be performed by an external input unit.

It is another object of this invention to provide a machine tool in which a stroke over status of a column moving instruction is checked with respect to each allowable movement range preset to each of a plurality of the machining regions and execution of the column moving instruction is prohibited when the stroke over status is detected.

It is still another object of this invention to provide a machine tool in which a machining origin is set to each of the plurality of palettes, and a machining program for a palette is modified so that the machining origin set to the palette is brought into coincidence with a reference machining origin.

It is yet another object of the invention to provide a machine tool in which the palette is prohibited from moving outside its associated machining region during the machining operation.

In order to achieve the above and other objects, there is provided, a machine tool comprising, a spindle head movable in a first direction, a spindle supported by said spindle head for undergoing machining of a workpiece, a column supporting said spindle head, said column being movable in a second direction perpendicular to the first direction and in a third direction perpendicular to both the first and second direction, a plurality of palettes each detachably mounting the workpiece, each of said plurality of palettes being movable into and away from its associated machining region and being adapted to be clamped when moved to a predetermined position within the machining region wherein a clamped palette indicative signal is produced when each of said plurality of palettes is clamped in the predetermined position, a table mounting the plurality of palettes thereon, and control means responsive to the clamped palette indicative signal for controlling the movements of said spindle head, said column and said plurality of palettes.

The machine tool further comprises first detection means for detecting the movement of said spindle head and producing a first detection signal when said spindle head moves out of a first predetermined range in the first direction, second detection means for detecting the movement of said column and producing a second detection signal when said column moves out of a second predetermined range in the second direction, third detection means for detecting the movement of said column and producing a third detection signal when said column moves out of a third predetermined range in the third direction, and wherein said control means is further responsive to said first, second and third detection signals.

According to one aspect of the invention, there is further provided storage means storing a plurality of machining programs and program numbers assigned to the plurality of machining programs for identifying each of the machining programs, each machining program containing a series of machining control data blocks, a central processing unit for sequentially supplying the machining control data blocks to said spindle, said spindle head and to said column in accordance with a machining program selected from the plurality of machining programs stored in said storage means, an input port for inputting to said central processing unit the clamped palette indicative signal identifying the palette clamped in the predetermined position, instructing means for instructing a selected program number to said input port, and wherein said central processing unit responsive to the clamped palette indicative signal calls from said storage means a machining program identified by the selected program number.

According to another aspect of the invention, there is further provided first storage means for storing a plurality of machining programs and program numbers assigned to the plurality of machining programs for identifying each of the machining programs, each machining program containing a series of machining control data blocks, a central processing unit for sequentially supplying the machining control data blocks to said spindle, said spindle head and to said column in accordance with the machining program stored in said first storage means, said machining control data block including column end position data indicative of an end position to which the column is finally moved from a preset position, setting means for setting an allowable movement range of said column over each of the plurality of machining regions, second storage means storing the allowable movement range of said column, stroke over checking means for checking whether the end position to which said column is finally moved from the preset position is included within the allowable movement range of said column, said checking means indicating a stroke over status when the end position is out of the allowable movement range of said column, and prohibiting means for prohibiting the machining control data block from being supplied to said column when said stroke over checking means indicates the stroke over status.

According to still another aspect of the invention, there is provided storage means storing a machining program and an amount of offset between the reference machining origin and each of the machining origins, the machining program being produced originating from the reference machining origin, and machining program modifying means for modifying the machining program to compensate for the amount of offset of the palette identified by the clamped palette indicative signal so that the machining origin of the palette identified by the clamped palette indicative signal is in coincidence with the reference machining origin.

According to still further aspect of the invention, there is provided emergency stop means for producing an emergent stop signal in response to the clamped status indicative signal, the first detection signal, the second detection signal and the third detection signal, said emergency stop means being provided to each of the plurality of machining regions.

DETAILED DESCRIPTION OF THE PREFERRED EMBODIMENTS

Figure 1:
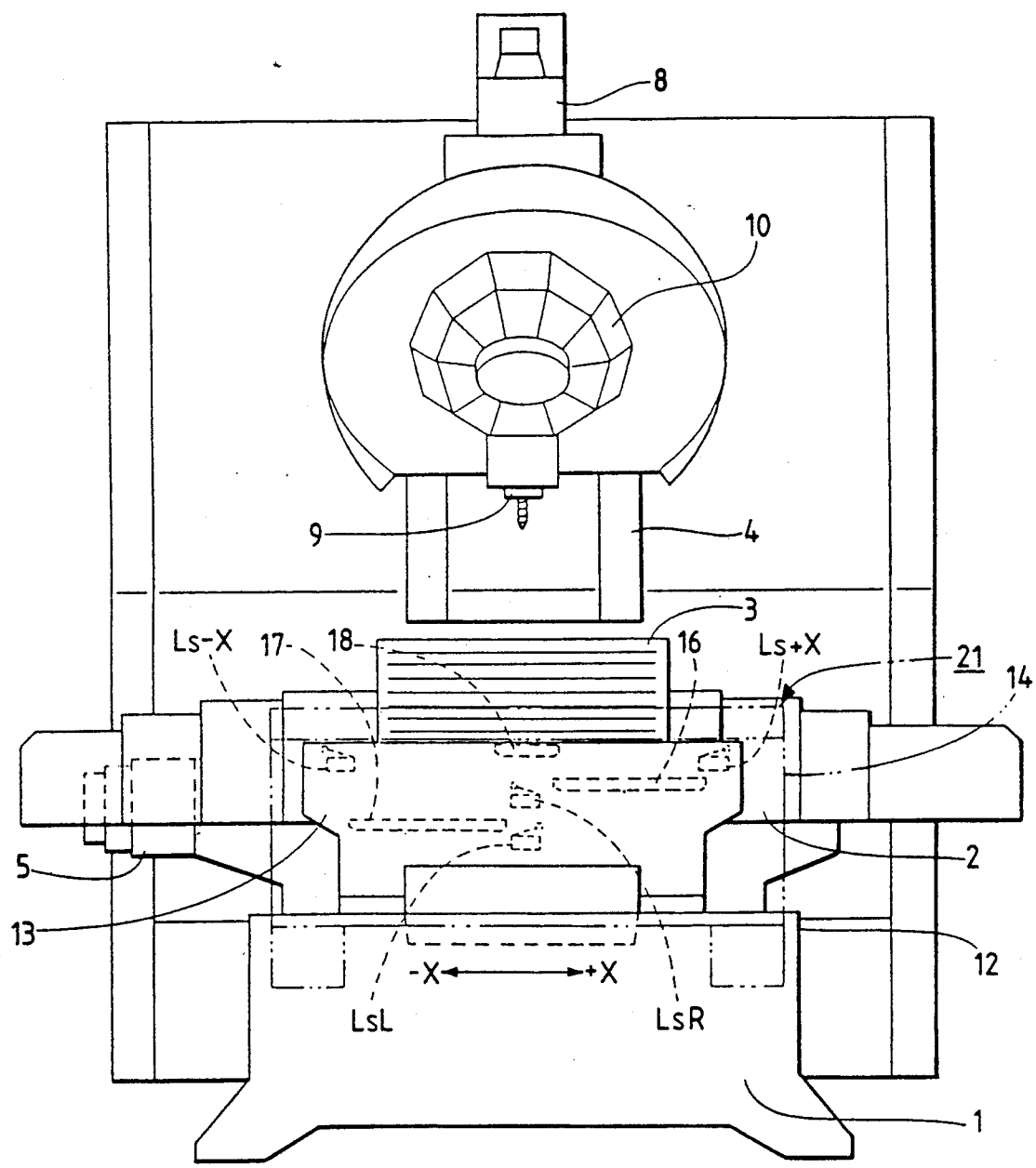
FIG. 1 is a plan view showing a machine tool.
Figure 2:
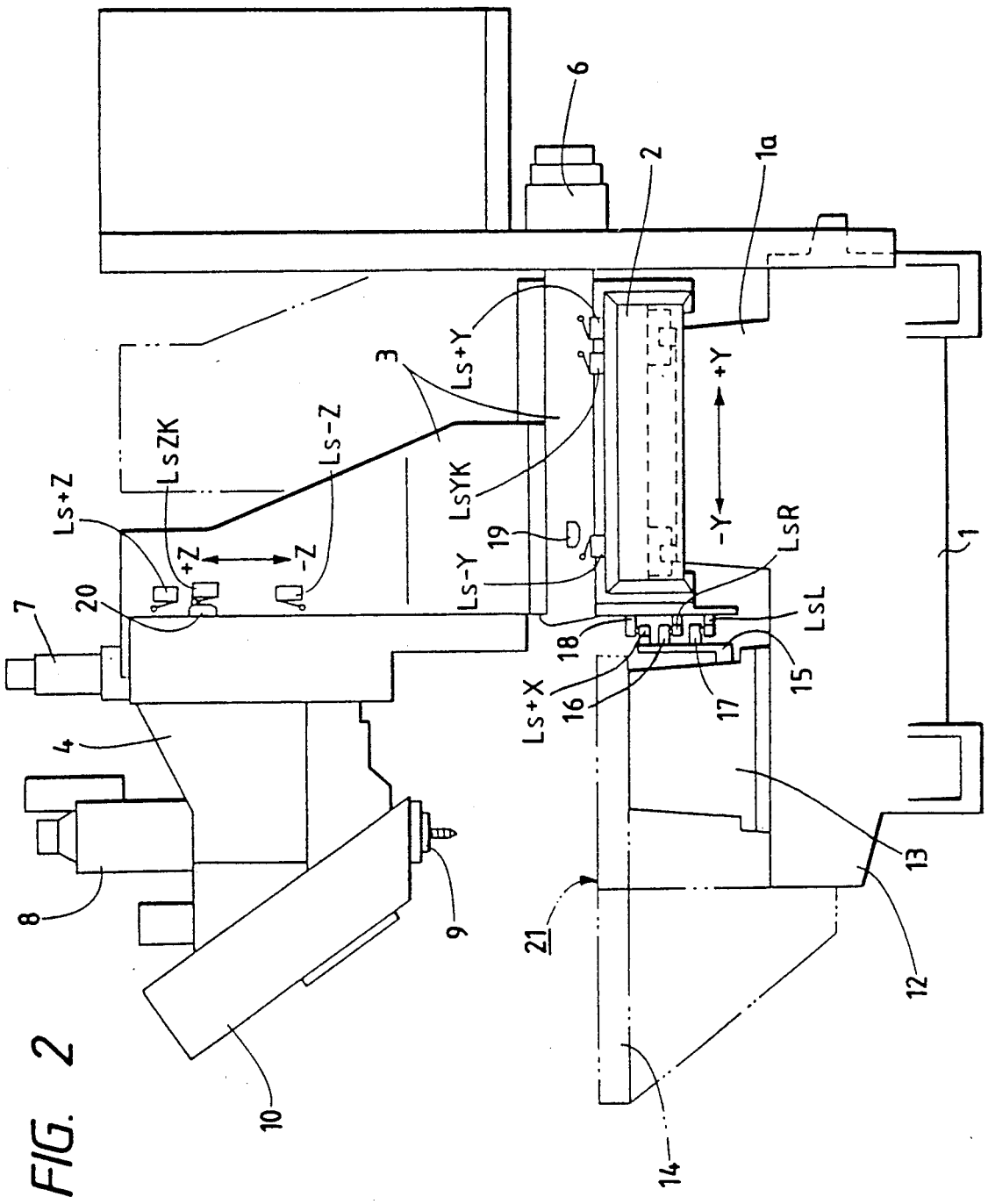
FIG. 2 is a side elevational view showing the machine tool.
Figure 3:
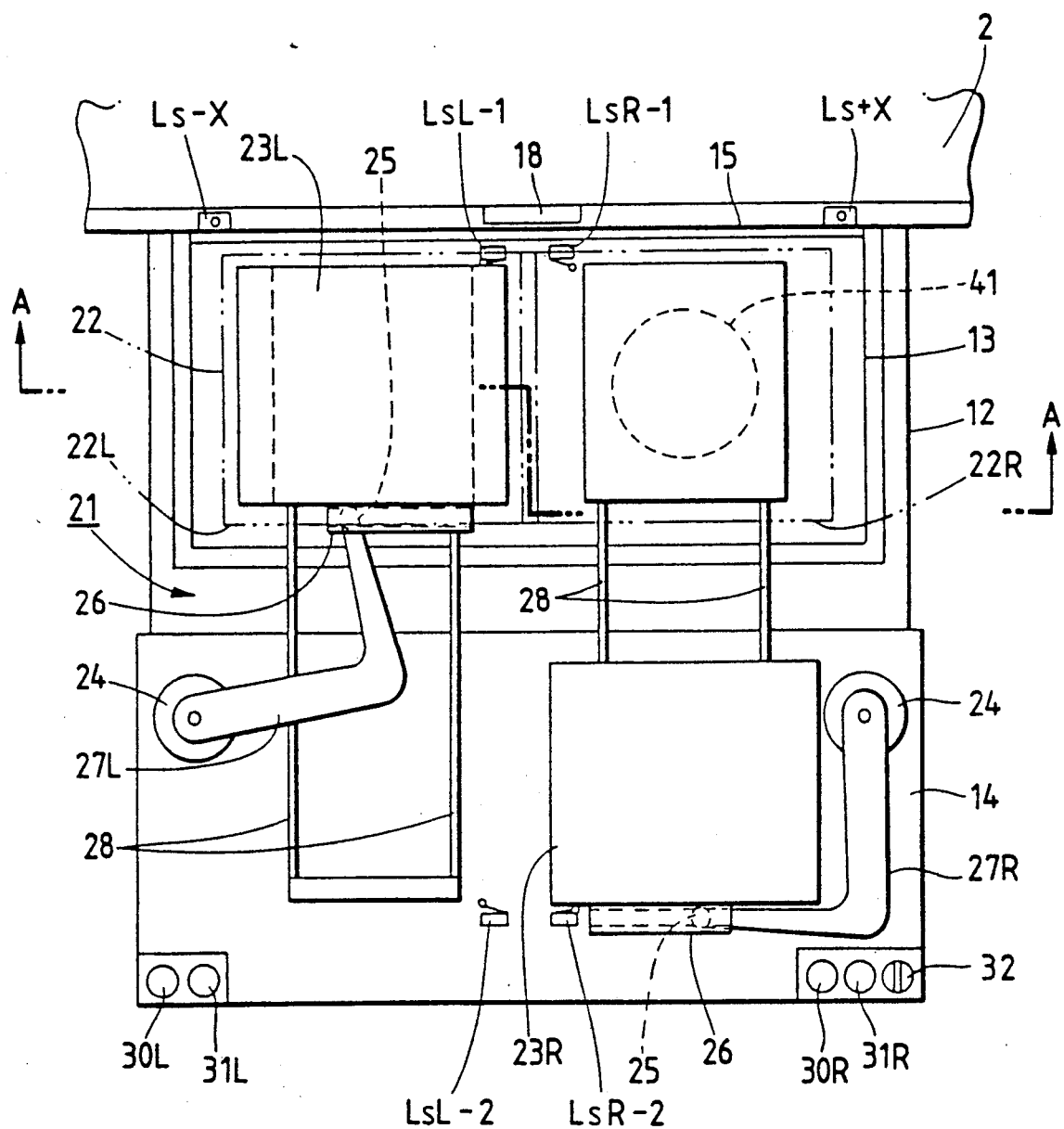
FIG. 3 is a plane view showing a palette transferring mechanism.
Figure 4:
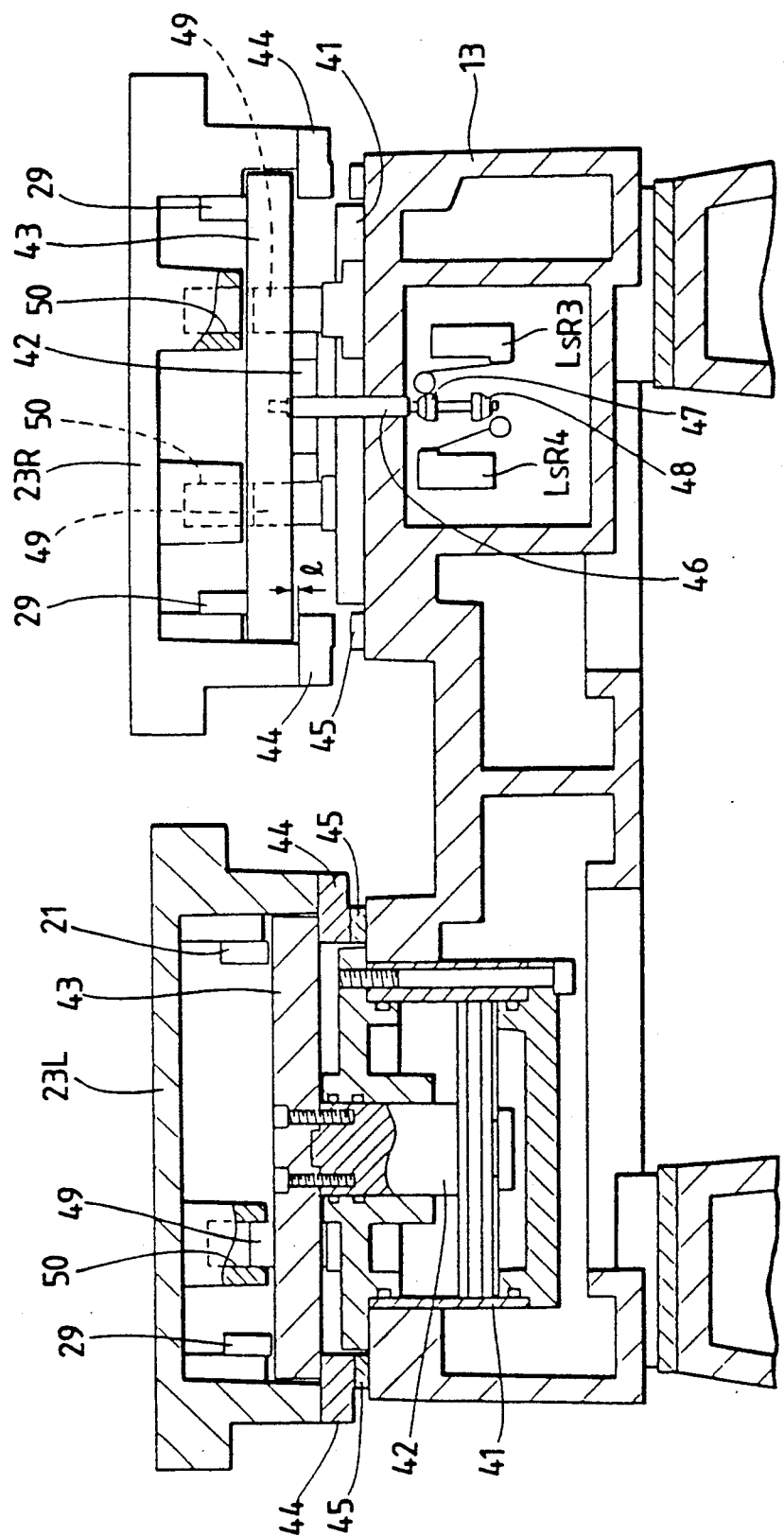
FIG. 4 is an enlarged plane view, with partial cutaway portion, cut along a line III—III indicated in FIG. 3.

In FIGS. 1 and 2, a plan view and a side elevational view of a machine tool according to a preferred embodiment of the invention are illustrated, respectively, in which a palette transferring mechanism 21 is shown with a two-dotted-chain line, and the mechanism 21 is illustrated in detail in FIGS. 3 and 4. Throughout the specification, the expressions "front", "rear", "above", "below", "laterally", or the like are used to define the various parts when the machine tool is disposed in an orientation in which it is intended to be used.

Referring to FIGS. 1 and 2, a base mount 1 generally includes two sections, that is, a rear portion 1a and a front table 12. A column base 2 is disposed on the rear portion 1a of the base mount 1 and is slidable with respect thereto in a lateral direction (or in an X direction). On the column base 2, a column 3 is disposed slidable in frontward and rearward directions (a second direction or Y direction). Further, on the column 3, a spindle head 4 is disposed slidable in vertical direction (or in a Z direction). To the rear portion 1a of the base mount 1, an X-axis drive motor 5 is operatively connected to move the column base 2. To the column base 2, a Y-axis drive motor 6 is operatively connected to move the column 3. To the column 3, a Z-axis drive motor 7 is operatively connected to move a spindle head 4. The spindle head 4 is provided with a spindle 9 rotatable about its own axis. The spindle head 4 is also provided with a spindle motor 8 connected to the spindle 9 for its rotation. The spindle head 4 further mounts thereon a rotary magazine type automatic tool changer 10. On the table portion 12 of the base mount 1, a stationary table 13 and a handling table 14 are fixedly secured. An attachment plate 15 is secured to the rear side face of the stationary table 13 and overrun limit switches Ls−X and Ls+X are attached to the attachment board 15 so that the movement of the column base 2 in the X direction is prohibited from overrunning. Further, two dogs 16, 17 are also fixedly attached to the attachment board 15 in spaced apart relation in the vertical direction. In the upper mid portion of the front side face of the column base 2, a dog 18 is provided so as to associate with the overrun limit switches Ls−X and Ls+X. Below the dog 18, limit switches LsR and LsL are disposed in spaced apart relation in the vertical direction to be in association with the dogs 16 and 17, respectively. The limit switches LsR and LsL are provided to detect the movement of the column base 2 within right and left machining regions, respectively.

In the rightside upper portion of the column base 2, overrun limit switches Ls−Y and Ls+Y are provided to detect the movement of the column 3 in the Y direction. A limit switch LsYK is provided inwardly of the overrun limit switch Ls+Y. A dog 19 is fixedly secured to the right side face of the column 3 so as to be in association with those limit switches Ls−Y, Ls+Y and LsYK. The limit switch LsYK is rendered ON when the spindle 9 is moved in the +Y direction and displaced from the upper surface of the stationary table 13.

Overrun limit switches Ls−Z and Ls+Z are provided in the right side face of the column 3 to detect the movement of the spindle head 4 in the Z direction. Below the limit switch Ls+Z, a limit switch LsZK is provided, and a dog 20 is fixedly secured to the spindle head 4 to be in association with these limit switches Ls−Z, Ls+Z and LsZK. The limit switch LsZK is rendered ON when the spindle head 4 is positioned in the uppermost retracted position.

Next, referring to FIG. 3, a palette transferring mechanism 21 will be described.

The upper surface of the stationary table 13 fixedly secured to the table 12 serves as a machining region 22 of the machine tool. The machining region 22 is divided into right and left machining regions 22R, 22L. Two palettes 23R, 22L are movable into and away from the machining regions 22R, 22L. That is, the palettes 22R, 22L are movable between their advanced positions on the machining regions and retracted positions on the non-machining regions.

The palette transferring mechanism 21 imparts movements of the palettes. More specifically, the mechanism 21 includes L-shaped arms 27R, 27L each having one end fixedly secured to a rotatable pneumatic cylinder 24 and another end attached to a roller 25. The roller 25 is engaged with a guide member 26. In accordance with pivotal movements of the pneumatic cylinders 24 within a predetermined range of angles, the L-shaped arms 27R, 27L are pivotally moved to thereby urge and retract the palettes 23R, 23L. Each of the palettes 23R, 23L is moved forwardly and rearwardly along a pair of rails 28. It should be noted that the forward movement of the palette indicates the direction in which the palette is moved toward the machining region from the non-machining region, and the rearward movement of the palette indicates the direction in which the palette is moved toward the non-machining region from the machining region. Rollers 29 (see FIG. 4) are rotatably provided in each inner side surface of the palettes 23R, 23L, which roll on the upper surface of the rails 28 extending between the advanced position and the retracted position. Arrivals of the palettes 23R, 23L at the advanced and retracted positions are detected by the switches LsL-1, LsL-2, LsR-1 and LsR-2. In the frontward position of the handling table 14, there are provided start buttons 30R, 30L for moving the right and left palettes 23R, 23L, emergency stop buttons 31R, 31L for stopping the right and left palettes 23R, 23L, and a single drive mode changeover switch 32.

When the palettes 23L, 23R are retracted to dispose on the handling table 14, the workpiece to be machined is mounted on the palettes or removed therefrom. When the palettes 23L, 23R are in the advanced positions, the palettes 23L, 23R are clamped or unclamped.

FIG. 4 is an enlarged cross-sectional view showing clamped and unclamped states of the palette. The right and left side cross-sectional views are depicted to show cross-sections cut in different cross-sections. In FIG. 4, the palette 23L is in a clamped state whereas the palette 23R is in an unclamped state. To the stationary table 13, a clamping pneumatic cylinder 41 is fixedly secured. In the uppermost end of the pneumatic cylinder 41, a clamper 43 is fixedly attached. In the unclamped state, the upper surface of the clamper 43 is in surface alignment with the upper surface of the rails 28. The rollers 29 rolling on the rails 28 smoothly roll on the clamper 43, and then the palettes 23R, 23L stop at the advanced positions.

To the bottom surfaces of the side portions of the palettes 23R, 23L, clamper plates 44 are fixedly secured which are spaced apart by a distance l from the lower surface of the clamper 43 so as to be mated with the clamp base 45 mounted on the stationary table 13. In the front side of the clamper 43, a dog pin 46 is fixedly secured to be oriented in the vertical direction and dogs 47 and 48 are fixed to the lower portion thereof in spaced apart relation. A limit switch LsR-3 is provided in association with the dog 47 to detect the unclamped status of the palette, and a limit switch LsR-4 is provided in association with the dog 48 to detect the clamped status of the palette. Although the dog pin 46, dogs 47, 48 and the limit switches LsL-3, LsL-4 are not shown in the left half portion of FIG. 4, those are provided in the same fashion as shown in the right half portion of FIG. 4.

An upstanding positioning pin 49 is provided on the stationary table 13 so as to be engageable with a positioning hole 50 formed on the lower surface of the palettes 23L, 23R. An air blow apparatus (not shown) is provided which ejects pressurized air toward the clamp base 45 to blow ground particles, processing liquid so as not to be adhered to the clamp base 45.

The palettes 23R, 23L are clamped in the advanced positions in a manner described below.

When the piston 42 of the pneumatic cylinder 41 is descended, the palette 23L (or 23R) mounted on the clamper 43 is also descended together with the clamper 43 and the positioning pins 49 are engaged with the corresponding positioning holes 50 to thereby acurately position the palette 23L. When the clamper plates 44 are in contact with the clamp bases 45, the descending motion is terminated and the clamper 43 is further descended by a distance l to apply a clamping pressure onto the upper surface of the clamper plates 44, thereby rigidly clamp the palette 23L. Simultaneously, the limit switch LsL-4 (or LsR-4) is actuated by the dog 48, thereby stopping the descending motion of the piston 42 to thus detect the clamping status. The unclamping operation of the palette 23L (or 23R) is performed reversely, in which the limit switch LsL-3 (or LsR-3) is actuated by the dog 47, thereby stopping ascending motion of the piston 42 to thus detect the unclamped status.

Figure 6:
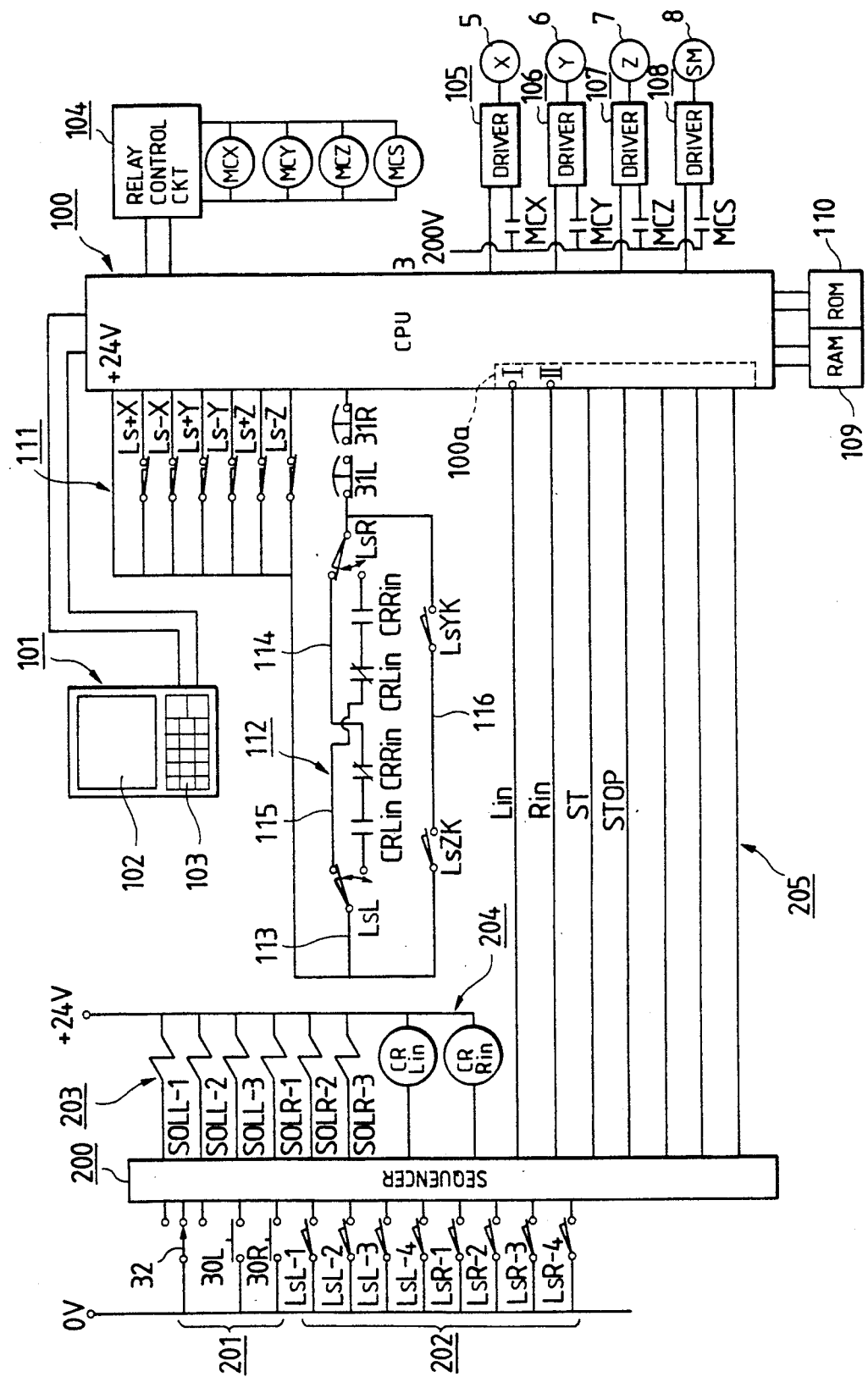
FIG. 6 is a block diagram showing a control circuit for use in the machine tool according to the present invention.

Various controls of the palettes 23L, 23R, such as clamping and unclamping the palettes 23R, 23L in the advanced positions, forward movement of the palettes toward the advanced position or backward movement toward the retracted position, are performed in response to the detection signals fed from the various limit switches attendant to the actuations of electromagnetic valves SOLL-1 through SOLL-3 and SOLR-1 through SOLR-3 shown in FIG. 6.

Figure 5:
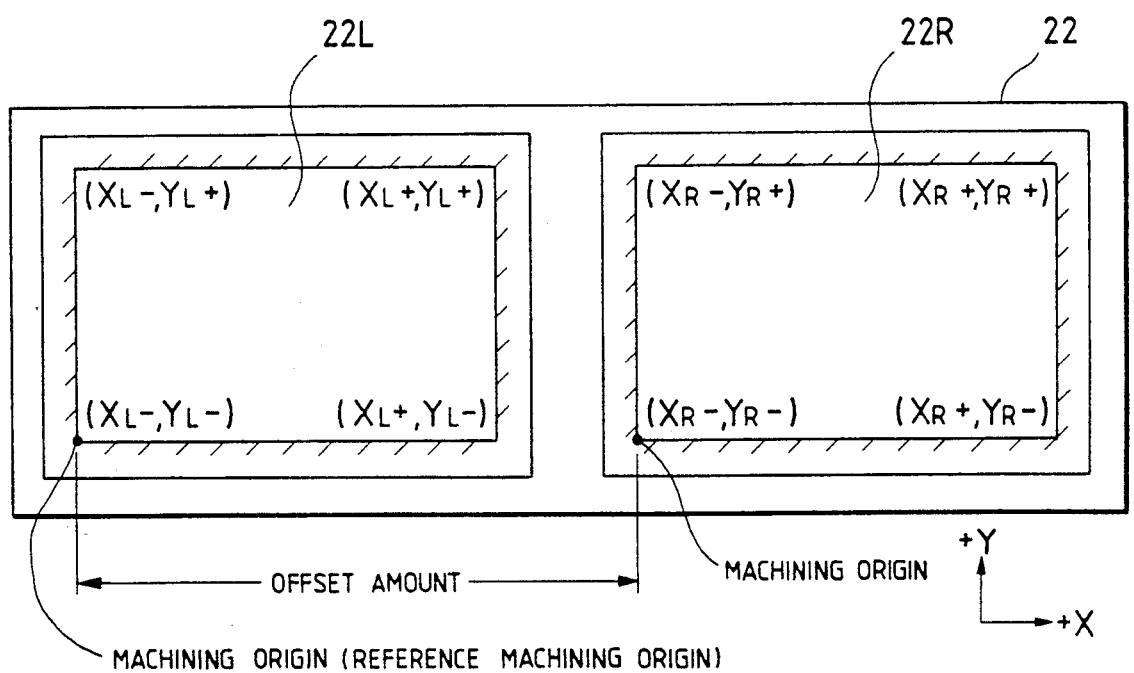
FIG. 5 is an explanatory diagram for description of a machining region defined on a stationary table.

FIG. 5 is an explanatory diagram for description of the machining region 22 set on the stationary table 13.

The machining region 22 consists of right half machining region 22R and left half machining region 22L. With respect to each of the right and left machining regions 22R, 22L, an allowable movement range of the column 3 is set on an X-Y coordinate plane as shown in FIG. 5. The values on the coordinate, XL−, XL+, XR−, XR+ and YL−, YL+, YR−, YR+ have been stored in advance in memories as controlling parameters of the machine tool. The allowable movement range of the column 3 can be set through a machining program or through an operation box to which control data can be entered. A stroke over of the moving command (to be described later) is determined based upon the allowable movement range.

Machining origins are set to the machining palettes 23R, 23L, and one of the machining origins is set as a reference machining origin. The machining program is produced with respect to the machining origin. The machining origin of the palette to be machined is shifted to the reference machining origin upon adding or subtracting an amount of offset value. If such is done, the same machining program can be used in the respective machining regions.

Next, a control circuit of the machine tool will be described with reference to FIG. 6.

The control circuit includes generally a central processing unit (CPU) 100 for controlling the machining operation of the machine tool, and a sequencer 200 which implements various controls, such as movements of the palettes, start and stop operations of the machine tool.

An operation box 101 is coupled to the CPU 100. The operation box 101 is provided with a CRT display 102, operation switches 103 for inputting various kinds of data. A relay control circuit 104 is connected to the CPU 100, which upon receipt of a relay signal from the CPU 100, energizes magnet relays MCX, MCY, MCZ and MCS. Drivers 105 through 108 corresponding respectively to the X, Y and Z axis motors and the main spindle motor are powered. Movement command signals are produced from the CPU 100 in accordance with a machining program, and the rotations of the X, Y, Z axis motors and the spindle motor are controlled by the movement command signals. A RAM 109 and a ROM 110 are further connected to the CPU 100. In the RAM 109, various kinds of machining programs and various kinds of machining data have been stored. In the ROM 110, a control program for the CPU 100 has been stored.

An overrun detection circuit 111 and an emergency stop circuit 112 are connected to the CPU 100. The overrun detection circuit 111 includes the overrun limit switches Ls−X, Ls+X, Ls−Y, Ls+Y, Ls−Z and Ls+Z. The limit switches Ls−X and Ls+X are provided to detect the overrun of the column base 2 in the X axial direction, the limit switches Ls−Y and Ls+Y are provided to detect the overrun of the column 3 in the Y axial direction, and the limit switches Ls−Z and Ls+Z are provided to detect the overrun of the spindle head 4 in the Z axial direction. The emergency stop circuit 112 is further connected to the overrun detection circuit 111.

The emergency stop circuit 112 includes two relay contact circuits 114 and 115 which are interposed between the limit switches LsL and LsR. The relay contact circuits 114, 115 are arranged to traverse each other at the center portions thereof. The lefthand end terminals of the relay contact circuits 114, 115 serve as changeover contacts for the limit switch LsL, while the righthand end terminals thereof serve as changeover contacts for the limit switch LsR. The emergency stop circuit 112 further includes manual stop buttons 31L and 31R connected in series between the CPU 100 and the limit switch LsR. The relay contact circuit 114 includes a first relay contact which is closed by a relay CRLin energized in response to a left palette signal (hereinafter referred to as "Lin signal") outputted from the sequencer 200 to the CPU 100, and a second relay contact which is opened by a relay CRRin energized in response to a right palette signal (hereinafter referred to as "Rin signal"). The first and second relay contacts are connected in series to each other. The relay contact circuit 115 further includes a third relay contact which is closed by a relay CRRin energized in response to the Rin signal and a fourth relay contact which is opened by a relay CRLin energized in response to the Lin signal. The third and fourth contacts are connected in series to each other. Details of the Rin signal and the Lin signal will be described later.

A machining region inter-movement permission circuit 116 including serial connection of the limit switches LsYK and LsZK is connected in parallel to the emergency stop circuit 112. When the limit switches LsYK, LsZK are ON, the spindle head 4 is allowed to move between the machining regions 22R and 22L. Specifically, the spindle head 4 is capable of moving between the machining regions 22R and 22L under the condition where the column 3 has been moved to the rearmost position in the +Y axial direction and the spindle 9 is out of the upper surface of the stationary table 13, and where the spindle head 4 is in the uppermost retracted position in the +Z axial direction. In such a condition, the spindle head 4 is movable between the machining regions 22R and 22L even if the emergency stop circuit 112 has been actuated or even the column base 2 is located in a position where the limit switches LsR and LsL are not simultaneously rendered ON.

In the emergency stop circuit 112, either one of the relay contact circuits 114 and 115 is connected between the limit switches LsR and LsL to interlock the same. Because either one of the limit switches LsL and LsR is rendered ON attendant to the travel of the column base 2 to the adjacent machining region and the corresponding movable contact is tripped over.

The emergency stop circuit 112 actuates in the following occasions.

(1) The case where the limit swiches LsR or LsL is OFF and hence the machining region movement detecting signal is not obtained at the time when the column base 2 is moving to adjacent machining region;

(2) The case where both the Rin signal and the Lin signal are outputted resulting from the malfunction of the sequencer 200;

(3) The case where the limit switch LsL or LsR is OFF due to the disconnection, positional displacement or damages of the limit switches; and (4) The case where the manual stop button 31L or 31R is depressed.

Upon actuation of the emergency stop circuit 112, an emergency stop signal is fed to the CPU 100. The CPU 100 interrupts the relay signal applied to the relay control circuit 104 to thereby deenergize the magnet relays MCX, MCY, MCZ and MCS so that the power supplies to the drivers 105 through 108 are interrupted. The rotations of the X, Y, Z axis motors and the spindle motor 5 through 8 are stopped while being applied with dynamic braking force.

A manual button circuit 201 and a limit switch circuit 202 are connected to the sequencer 200. The manual button circuit 201 includes a mode changeover circuit having an auto mode/single drive mode changeover switch 32 for changing the operational mode of the right and left palettes 23R and 23L, and a start circuit having a right palette start button 30R and a left palette start button 30L. The limit switch circuit 202 includes the limit switches LsL-1 through LsL-4 and LsR-1 through LsR-4. A solenoid valve driving circuit 203 is further connected to the sequencer 200, which includes the solenoid valves SOLL-1 through SOLL-3 and SOLR-1 through SOLR-3. These colenoid valves are used to switch an air pressure circuit (not shown) for controlling the rotational pneumatic cylinder 24 and the pneumatic cylinder 41. A relay circuit 204 is further connected to the sequencer 200, which includes relays CRRin and CRLin energized in response to the Rin signal and the Lin signal, respectively.

Signal lines are connected between the CPU 100 and the sequencer 200 for the transmission of the Lin signal, Rin signal, start signal, stop signal and various control signals. The CPU 100 is provided with an input/output interface 100a. The CPU 100 recognizes the statuses of the various signals inputted thereinto or outputted therefrom from the voltages impressed on input/output terminals of the interface 100a. The Lin signal and the Rin signal are inputted to the input terminals I and II of the interface 100a.

A program number assigned to each of the machining programs is entered from the operation box 101 (external input means). Such a program number is impressed on the input terminals I and II. The machining programs and their program numbers have been stored in the RAM 109. CPU 100 is calls the machining program identified by the machining number based upon the signal statuses on the input terminals I and II, which will be later described in detail.

Next, the Lin signal and the Rin signal will be described.

The Lin signal and the Rin signal are produced as position signals which indicate the positions of the palettes 23R and 23L advanced into the respective machining regions and claimed therein. The advancing and retracting movements of the respective palettes 23R, 23L are controlled independently of each other. In the occasion that during machining of the lefthand palette 23L, the righthand palette 23R is eventually advanced into the corresponding machining region and claimed therein and a start button for the right palette is depressed, the position signal for the left machining palette (the Lin signal) is produced in precedence to the other (the Rin signal). When the machining of the palette 23L is terminated and the column 3 and the spindle head 4 have moved to the position where the limit switches LsYK and LsZK turn ON, the Lin signal is rendered OFF and thereafter the Rin signal is rendered ON. These processing are implemented by a software. That is, both the Lin signal and the Rin signal are not simultaneously rendered ON. Should these two signals be produced simultaneously, the emergency stop circuit 112 is actuated or an error processing is executed.

Figure 7:
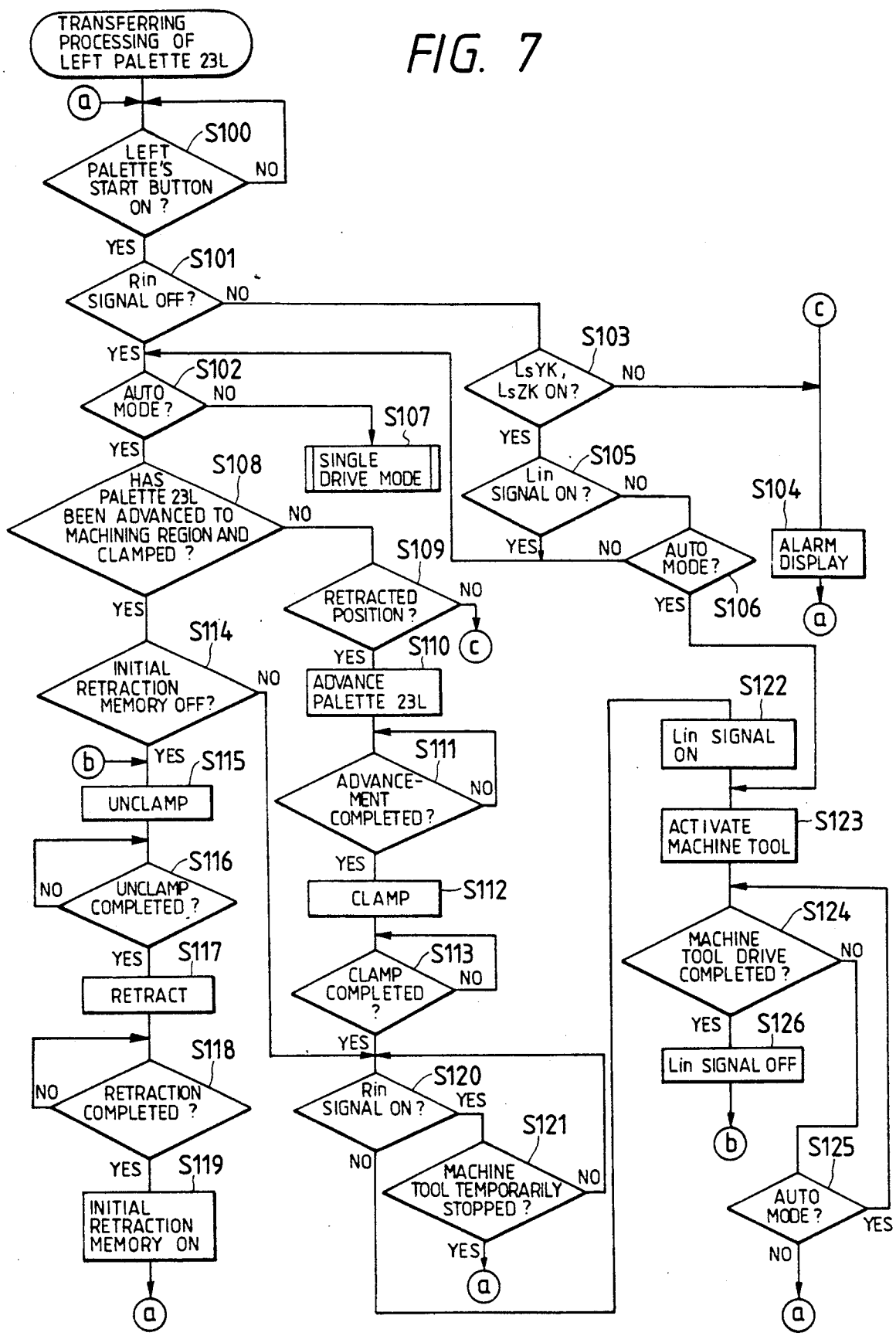
FIG. 7 is a flowchart for description of palette transferring processings.
Figure 8:
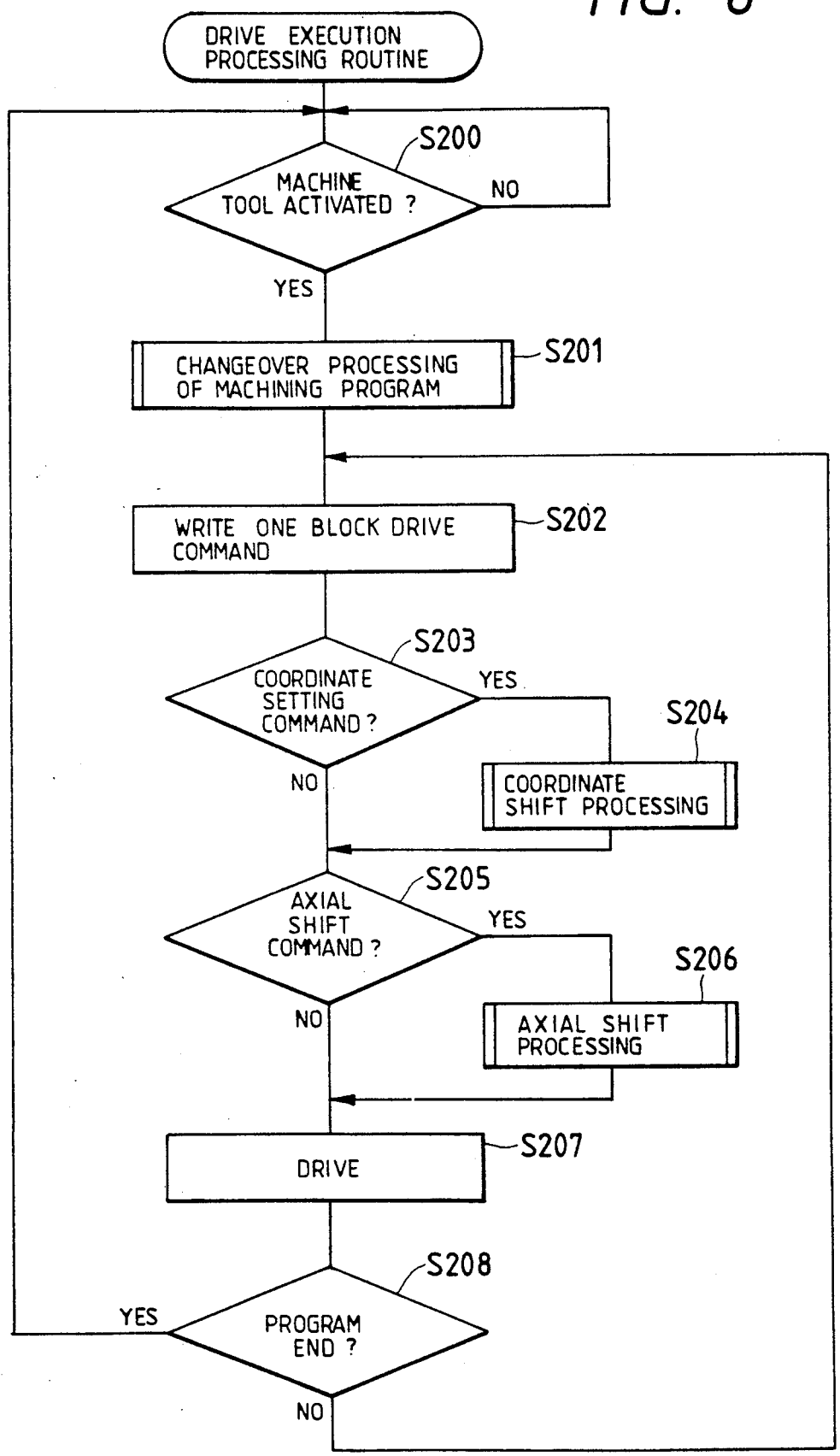
FIG. 8 is a flowchart illustrating sequences of a main routine for an overall drive execution processings.

The advancing and retracting processings of the palettes will be described with reference to the flowchart shown in FIG. 7. In the following description, the processings with respect only to the lefthand palette 23L will be described, since the operations of both the righthand and lefthand palettes 23R and 23L are the same. Only different processings for the righthand palette 23R will be referred to.

In step 100, it is checked whether or not the left palette's start button 30L is ON. If affirmative, it is checked in step 101 whether or not the Rin signal is OFF. If affirmative, i.e. the Rin signal is OFF, it is checked in step 102 whether or not the system is in auto mode. If, in step 101, decision is made so that the Rin signal is ON, the routine proceeds to step 103 where it is checked whether or not both the limit switches LsYK and LsZK are ON. Specifically, it is checked whether or not the column 3 and the spindle head 4 are located in the positions movable between the right and left machining regions. If the decisions made in step 103 is "NO", the routine proceeds to step 104 where an alarm display is made to alert the operator, whereupon the routine returns to step 100. If the decision made in step 103 is "YES", it is checked in step 105 whether or not the Lin signal is OFF. If affirmative, i.e. if the Lin signal is OFF, the routine returns to step 102. If the decision made in step 105 is "NO" indicating that the Lin signal is ON, the routine proceeds to step 106 where it is checked whether or not the system is in the auto mode. In this condition, it has been confirmed that the lefthand machining region 22L is in a condition capable of being machined. If the decision made in step 106 is "YES", the routine proceeds to step 123 where the machine tool is activated. If the decision made in step 106 is "NO", the routine returns to step 102. If the decision made in step 102 is "NO" indicating that the system is not the auto mode, the routine proceeds to step 107 where the single drive mode is called, whereupon the single drive mode operation is performed with respect to the lefthand palette 23L. In the single drive mode operation, series of operations with respect to one palette are performed independently of the operations of the other palette. Detailed description of the single drive mode operation will not be made herein.

If the decision made in step 102 indicates the auto mode, the routine proceeds to step 108 where it is checked whether or not the palette 23L has been advanced to the machining region 22L and has been clamped therein. If the decision made in step 108 is "NO", the routine proceeds to step 109 where it is checked whether or not the palette 23L is in the retracted position, i.e. whether or not the palette 23L is on the handling table 14. If the decision made in step 109 is "NO", the routine returns to step 104, since the palette to be machined is not present. In step 104, the alarm display is made. If the palette 23L to be machined is in the retracted position, the decision made in step 109 results in "YES". In this case, the routine proceeds to step 110 where the palette 23L is advanced. In step 111, it is checked whether the advancement of the palette 23L in the frontward direction has been completed. If the palette 23L has been fully advanced, then it is clamped in step 112, and the routine advances to step 120 upon confirming the completion of the clamping in step 113.

If the decision made in step 108 is "YES" indicating that the palette 23L has been fully advanced and clamped, the routine proceeds to step 114 where it is checked whether or not an initial retraction memory is OFF. The initial retraction memory is OFF under the condition that the palette has been loaded in the machining region at the time when the machine tool is powered. Regardless of auto or manual operation, this memory is rendered ON once the palette is retracted onto the handling table 14. This memory is provided so that the machining operation is not performed with respect to the palette which has been loaded in the machining region at the time of powering the machine tool. The palette is forcibly retracted for the sake of checking the workpiece.

If, in step 114, the initial retraction memory is OFF, "YES" decision is made, whereupon the palette 23L is unclamped in step 115 and is retracted in step 117 upon confirming in step 118 that the unclamping of the palette 23L has been completed. In step 119, the initial retraction memory is rendered ON and the routine returns to step 100.

In step 120, it is checked whether or not the Rin signal is ON. If the decision made in step 120 is "YES", then the routine proceeds to step 121 where it is checked whether or not the machine tool is in a temporary stop condition. If the decision made in step 121 is "NO", precedence is given to the Rin signal and the system waits until the Rin signal is rendered OFF upon completion of the machining in the righthand machining region 22R. If the decision made in step 121 is "YES", the routine returns to step 100. The latter processing is performed to compensate for restarting the machine tool after temporarily stopping the same. Specifically, the lefthand palette 23L is driven upon manipulation of the left palette's start button 30L so that the palette 23L is not unintentionally driven at the time when the Rin signal is rendered OFF.

When it is confirmed in step 120 that the Rin signal is OFF, the machine tool is activated in step 123 upon rendering the Lin signal ON in step 122, and it is checked in step 124 whether or not the driving has been completed. If the driving has not yet been completed, it is checked in step 125 whether or not the system is in the auto mode. If "NO", the routine returns to step 100 to wait for the manipulation of the left palette's start button 30L, because the system is in the single drive mode. If the decision made in step 125 is "YES", the routine advances to step 126 upon completion of the driving where the Lin signal is rendered OFF. Then, in step 115, the palette 22L which has been machined is removed.

With respect to the advancement and retraction processings of the righthand palette 22R, the flowchart shown may be changed in such a manner that the left palette's start button 30L appearing in step 100 is replaced with the right palette's start button 30R, the Rin signal in steps 101 and 120 is replaced with the Lin signal, and the Lin signal in steps 105, 122 and 126 is replaced with Rin signal.

In the processing as described above, completion of the movement of the palettes 23R, 23L to the retracted positions, completion of the movement of the palettes 23R, 23L to the advanced positions, and the detection of clamped or unclamped conditions are detected from the outputs of the limit switches LsL-1 through LsL-4 and LsR-1 through LsR-4.

Next, drive execution processings of the machine tool will be described with reference to the flowcharts shown in FIGS. 8 through 11.

In step 200, start of the machine tool is confirmed. In step 201, the changeover processing of the machining program is executed. In the subsequent step 202, one block of a drive command is written. If, in step 203, the drive command is discriminated as a coordinate setting instruction, the routine advances to step 204 where the coordinate shift processing is executed. If, in step 205, the drive command is discriminated as an axial shift command, the axial shift processing is executed in step 206. In step 207, based upon the machining program, various data, and various control signals fed from the sequencer, the driving is executed in step 207. If the program is not ended, the processings in steps 202 et seq. are executed. Upon acknowledging the program end, the routine returns to step 200.

Subroutines of the changeover processing of the machining program executed in step 201, the coordinate shift processing in step 204, and the axial shift processing in step 206 will be described later.

Figure 9:
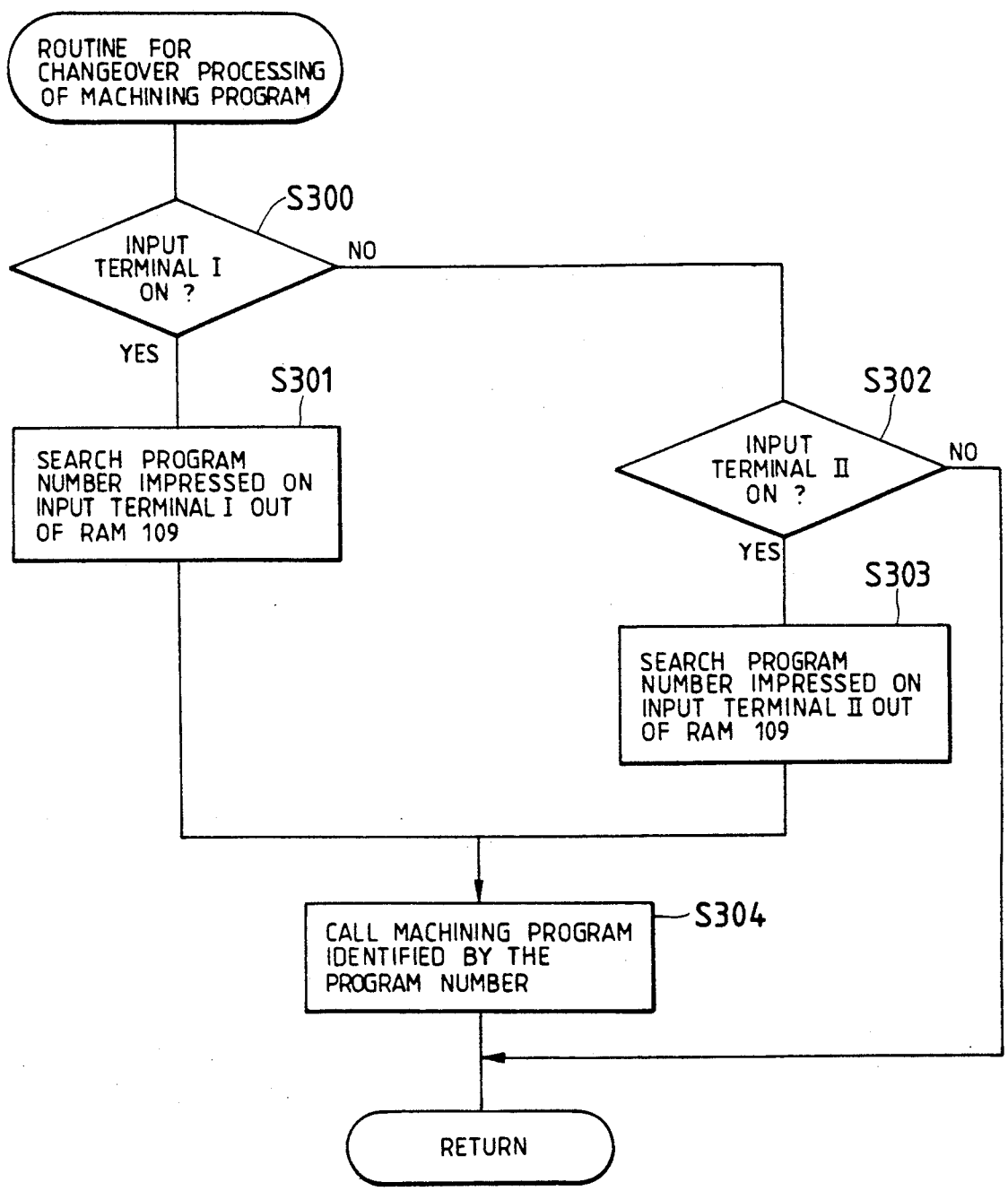
FIG. 9 is a flowchart illustrating a routine for implementing switching processings.

FIG. 9 is a flowchart illustrating the changeover processing routine of the machining program.

In step 300, the CPU 100 checks whether or not the input terminal I of the input/output interface 100a (to which the Lin signal is fed from the sequencer 200) is ON. If affirmative, in step 301, the program number impressed on the input terminal I by means of the operation box 103 (external input means) is searched out of the RAM 109. If the decision made in step 300 is "NO", the routine advances to step 302 where the CPU 100 checks whether or not the input terminal II (to which the Rin signal is fed from the sequencer 200) is ON. If affirmative, the routine advances to step 303 where the program number impressed on the input terminal II is similarly searched out of the RAM 109. If the decisions made in steps 300 and 302 are "NO", the routine returns as it stands. In the subsequent step 304, the machining program identified by the program number which the CPU 100 has searched is called from the RAM 109 and then the processing returns to the main routine.

With the processings as described above, designation and alteration of the machining programs can readily be implemented by impressing a prescribed program number on the input terminals I and II.

Figure 10:
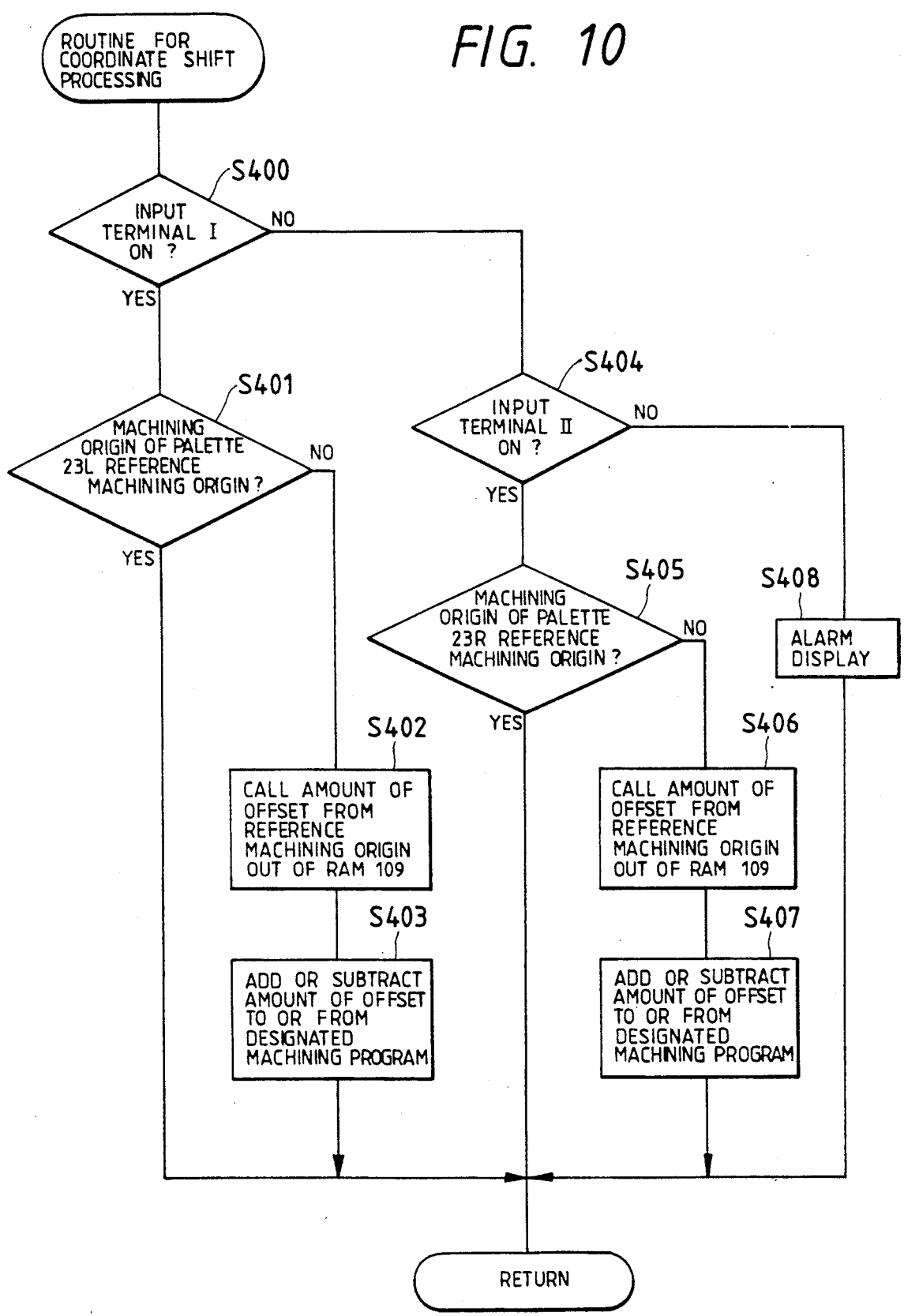
FIG. 10 is a flowchart illustrating a routine for coordinate shift processings.

FIG. 10 is a flowchart for description of the coordinate shift processings.

The CPU 100 checks in step 400 whether or not the input terminal I is ON. If the Lin signal outputted from the sequencer 200 is impressed on the input terminal I, the routine proceeds to step 401 where it is checked whether or not the machining origin of the lefthand palette 23L to be machined is the machining reference point. If "YES", the processing returns to the main routine whereas if "NO", the routine advances to step 403 where the machining origin of the palette to be machined is shifted to the reference machining origin by adding a certain value to or subtracting the certain value from the machining program so that the machining program is available, whereupon the processing returns to the main routine. If the decision made in step 400 is "NO", it is checked whether or not the input terminal II is ON. If the Rin signal is applied to the input terminal II, the processings executed in steps 401 through 403 are executed in similar fashion in steps 405 through 407 with respect to the righthand palette 23R to be machined. When the decisions made in both steps 400 and 404 are "NO", an alarm display is made in step 408, thereby alerting the operator.

The coordinate shift processing is applied to the case where workpieces mounted on the righthand and lefthand palettes 23R and 23L are intended to be machined to the same shape or configuration while using the same machining program. Usually, the coordinates of the Y axis are made in coincidence with each other and only the coordinates of the X axis are adjusted. Should there be offsets in both the X and Y axes, an amount of offset for each of the axes needs to be computed and adjusted in the similar fashion as is done with respect to the X axial direction.

Figure 11:
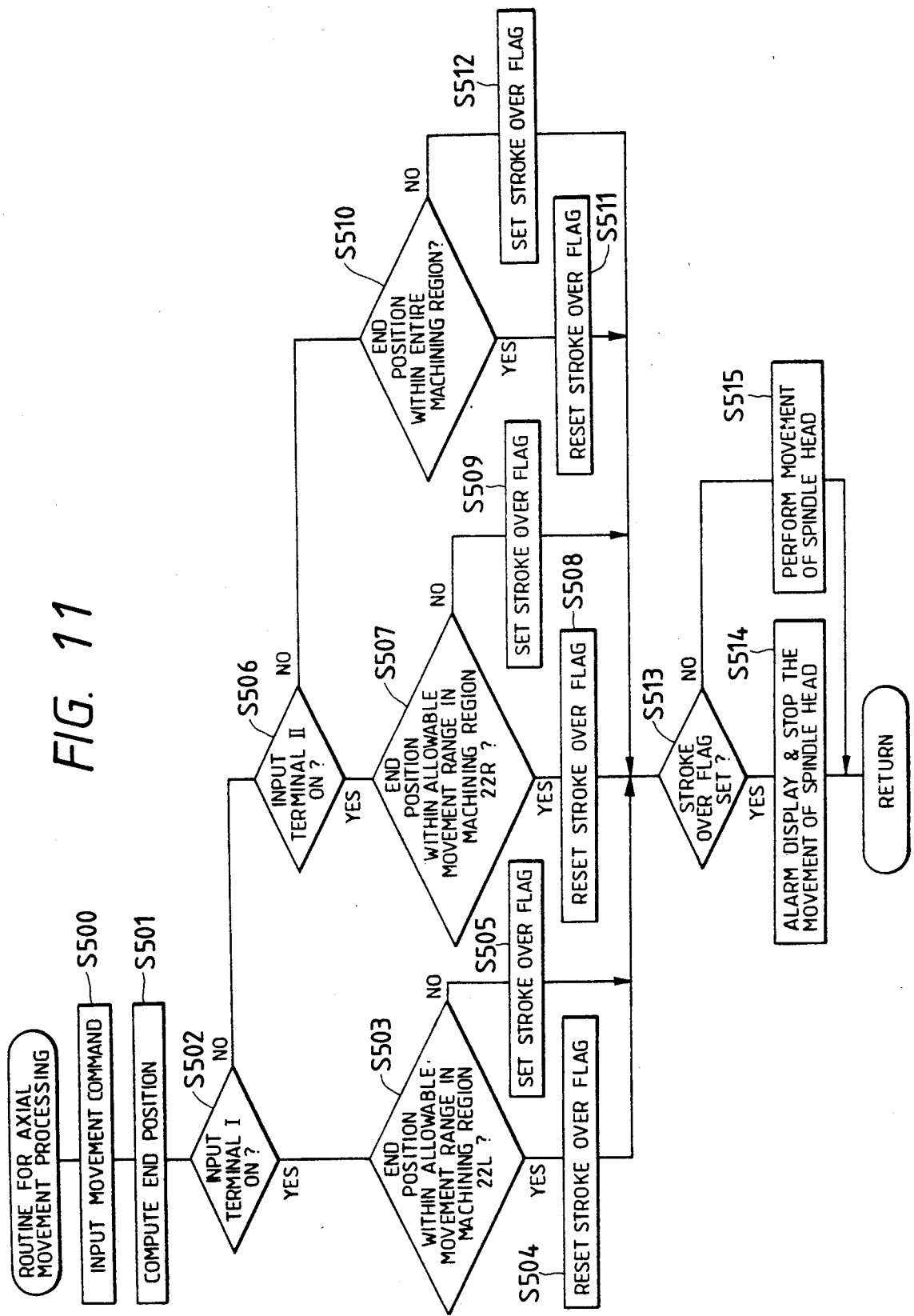
FIG. 11 is a flowchart illustrating a routine for axial movement processings.

FIG. 11 is a flowchart for description of the processing of the axial movement.

When, in step 500, the movement command is entered to move the column 3, the end position of the movement command is computed in step 501. In the following step 502, the CPU 100 checkes whether or not the input terminal I is ON. If the Lin signal is applied to the input terminal I, the routine proceeds to step 503 where it is checked whether or not the end position thus computed falls within an allowable movement range in which the column 3 is allowed to move. If the decision made in step 503 is "YES", a stroke over flag is reset in step 504 whereas if "NO", the stroke over flag is set in step 505. When the decision made in step 502 is "NO", it is checked whether or not the input terminal II is ON. If "YES", the same processing as executed in steps 503 through 505 are executed in step 507 through 509 with respect to the machining region 22R. When neither the Lin signal nor the Rin signal is ON, the palette does not exist in both the machining regions 22R and 22L. Therefore, it is checked in step 510 whether or not the end point of the movement command exists in the entire machining region. If "YES", the stroke over flag is reset in step 511 whereas if "NO", the same flag is set in step 512. After termination of the processings of the stroke over flag, the routine advances to step 513 to check whether or not the stroke flag is ON. If "YES", the routine advances to step 514 where the alarm display is made and the movement of the spindle head is not performed, whereas if the flag is OFF, the movement thereof is performed in step 515, whereupon the processing returns to the main routine. In the event where both the Lin signal and the Rin signal are rendered ON, the emergency stop circuit 111 is actuated to immediately stop the operation.

While the present invention has been described with reference to a specific embodiment, it would be apparent for those skilled in the art that a variety of changes and modifications may be made without departing from the scope and spirit of the invention. For example, the number of the machining regions provided in the stationary table is not limited to two but three or more than three machining regions may be provided therein. Further, the present invention is applicable to an industrial sewing machine provided with a plurality of working regions, in which a sewing needle is used as a machining tool.

What is claimed is:
1. A machine tool comprising:
a table defining a plurality of machining regions;
a spindle head movable relative to the table in a first direction;
a spindle supported by said spindle head for undergoing machining of a workpiece;
a column supporting said spindle head, said column being movable in a second direction perpendicular to the first direction and in a third direction perpendicular to both the first and second direction;
a plurality of palettes each detachably mounting the workpiece, the plurality of palettes including means for moving each of said plurality of palettes into and away from an associated machining region, means for clamping each of said plurality of palettes when each palette is moved to a predetermined position within the machining region, and means for producing a clamped palette indicative signal when each of said plurality of palettes is clamped in the predetermined position;
first detection means for detecting the movement of said spindle head and producing a first detection signal when said spindle head moves out of a first predetermined range in the first direction;
second detection means for detecting the movement of said column and producing a second detection signal when said column moves out of a second predetermined range in the second direction;
third detection means for detecting the movement of said column and producing a third detection signal when said column moves out of a third predetermined range in the third direction;
control means responsive to the clamped palette indicative signal and the first, second and third detection signals for controlling the movements of said spindle head, said column and said plurality of palettes;
first storage means for storing a plurality of machining programs and program numbers assigned to the plurality of machining programs for identifying each of the machining programs, each machining program containing a series of machining control data blocks;
a central processing unit for sequentially supplying the machining control data blocks to said spindle, said spindle head and said column in accordance with the machining program stored in said first storage means, said machining control data block including column end position data indicative of an end position to which the column is finally moved from a preset position;
setting means for setting an allowable movement range of said column over each of the plurality of machining regions;
second storage means for storing the allowable movement range of said column;
stroke over checking means for checking whether the end position to which said column is finally moved from the preset position is included within the allowable movement range of said column, said checking means indicating a stroke over status when the end position is out of the allowable movement range of said column; and
prohibiting means for prohibiting the machining control data block from being supplied to said column when said stroke over checking means indicates the stroke over status.

2. A machine tool according to claim 1, further comprising:
an input port for inputting to said central processing unit the clamped palette indicative signal identifying the palette clamped in the predetermined position;

instructing means for instructing a selected program number to said input port; and wherein said central processing unit responsive to the clamped palette indicative signal calls from said first storage means a machining program identified by the selected program number.

3. A machine tool according to claim 1, further comprising:

third storage means for storing a machining program and an amount of offset between the reference machining origin and each of the machining origins, the machining program being produced originating from the reference machining origin; and machining program modifying means for modifying the machining program to compensate for the amount of offset of the palette identified by the clamped palette indicative signal so that the machining origin of the palette identified by the clamped palette indicative signal is in coincidence with the reference machining origin.

4. A machine tool according to claim 1, further comprising:

emergency stop means for producing an emergency stop signal in response to the clamped status indicative signal, the first detection signal, the second detection signal and the third detection signal, said emergency stop means being provided to each of the plurality of machining regions.

* * * * *